United States Patent
El Ferkouss et al.

(10) Patent No.: US 12,192,924 B2
(45) Date of Patent: Jan. 7, 2025

(54) FRAME BURST OVERLAPPING BASIC SERVICE SET HANDLING

(71) Applicant: HEWLETT PACKARD ENTERPRISE DEVELOPMENT LP, Houston, TX (US)

(72) Inventors: Omar El Ferkouss, St. Laurent (CA); Andre Beaudin, St. Laurent (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 135 days.

(21) Appl. No.: 17/489,426

(22) Filed: Sep. 29, 2021

(65) Prior Publication Data

US 2023/0096535 A1     Mar. 30, 2023

(51) Int. Cl.
| | |
|---|---|
| *H04W 56/00* | (2009.01) |
| *H04W 72/121* | (2023.01) |
| *H04W 72/20* | (2023.01) |
| *H04W 74/0816* | (2024.01) |

(52) U.S. Cl.
CPC ...... *H04W 56/001* (2013.01); *H04W 72/121* (2013.01); *H04W 72/20* (2023.01); *H04W 74/0816* (2013.01)

(58) Field of Classification Search
None
See application file for complete search history.

(56) References Cited

U.S. PATENT DOCUMENTS

| | | | |
|---|---|---|---|
| 9,060,352 B2 | 6/2015 | Chan et al. | |
| 9,226,332 B2 | 12/2015 | Hedayat | |
| 9,538,395 B2 | 1/2017 | Sadek et al. | |
| 9,801,206 B2 | 10/2017 | Hedayat | |
| 10,320,459 B2 | 6/2019 | Zhang et al. | |
| 10,631,305 B2 | 4/2020 | Desai et al. | |
| 2008/0144586 A1* | 6/2008 | Kneckt | H04W 74/002 370/337 |
| 2016/0353329 A1 | 12/2016 | Kakani | |
| 2017/0142746 A1* | 5/2017 | Koorapaty | H04B 17/318 |
| 2018/0115981 A1* | 4/2018 | Kim | H04W 74/0808 |
| 2020/0053634 A1 | 2/2020 | Patwardhan et al. | |
| 2020/0112871 A1* | 4/2020 | Merlin | H04W 28/0268 |
| 2020/0288323 A1 | 9/2020 | Silverman et al. | |
| 2023/0093547 A1* | 3/2023 | Park | H04W 52/24 |

FOREIGN PATENT DOCUMENTS

WO    2015/013401 A1    1/2015

* cited by examiner

*Primary Examiner* — Pamit Kaur
(74) *Attorney, Agent, or Firm* — Sheppard Mullin Richter & Hampton LLP

(57) ABSTRACT

Systems and methods are provided for frame burst overlapping basic service set (OBSS) handling. In various embodiments, the disclosed methods and systems provide for synchronizing access points (APs) in the same channel. Based on the synchronizing, the APs in the same OBSS channel can determine a distribution policy for using frame bursting. Each AP can use frame bursting in accordance with the distribution policy. In various embodiments, the APs can periodically send frame burst synchronization packets. The frame burst synchronization packets can indicate respective numbers of client devices associated with each AP. Based on the frame burst synchronization packets sent by the APs, a total number of client devices using the same channel can be determined. The distribution policy for using frame bursting can be determined based on the total number of client devices.

20 Claims, 7 Drawing Sheets

FRAME BURST OVERLAPPING BASIC SERVICE SET HANDLING

BACKGROUND

Advances in computer technologies have led to increasing integration of computer technologies in various industries. For example, many entities across various industries rely on wireless networking technologies for the storage, communication, and delivery of various products or services. In a wireless network, client devices wirelessly connect to a network through an access point (AP). The AP connects to a wired network and facilitates use of the wired network by the client devices that are wirelessly connected to the AP. Wireless networking technologies provide improvements in other technologies and industries. However, as wireless networking technologies become increasingly integrated in various industries and the use of wireless networking technologies increases, various challenges arise in wireless networking technologies. The Institute of Electrical and Electronics Engineers (IEEE) has issued various standards, such as the 802.11 standard to address the various challenges in the field of wireless networking. Nevertheless, wireless networking technologies continue to face challenges as the use of wireless networking technologies increases.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
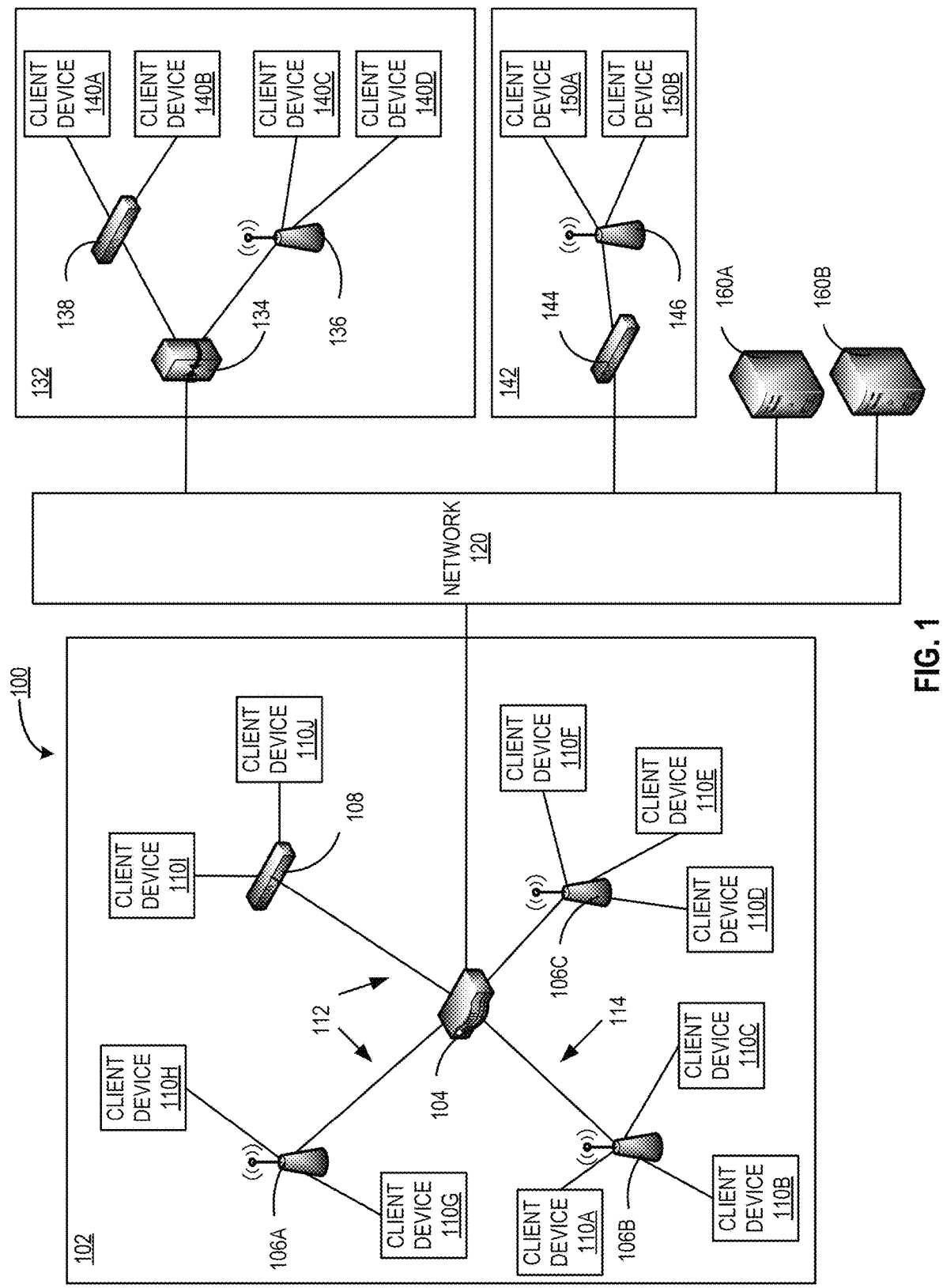
FIG. 1 illustrates an example network configuration that may be implemented for an organization, such as a business, educational institution, governmental entity, healthcare facility, or other organization.

The figures are not exhaustive and do not limit the present disclosure to the precise form disclosed.

DETAILED DESCRIPTION

As use of wireless networking technologies increases, density in wireless networks also increases. Increased density in wireless networks, as well as other factors, create various challenges in the deployment of wireless networks. For example, increased density in wireless networks has created challenges associated with increased medium contention among wireless networks. Medium contention can occur when access points (APs) and client devices associated with different wireless networks use the same channel for communication and are close enough in physical proximity to hear each other on the same channel. Overlapping basic service sets (OBSS) can refer to situations such as these where multiple basic service sets, associated with different wireless networks, are provided through the same channel, and connect APs and client devices that are close enough in physical proximity to hear each other physically. When APs and client devices associated with different wireless networks can hear each other on the same channel, collisions can occur, and network performance of the different wireless networks can degrade significantly.

Various approaches to improving wireless networking technologies are directed to improving throughput in wireless connections. For example, frame bursting refers to techniques in wireless networking that involves network devices (e.g., APs, client devices) sending frames in succession through a wireless channel without relinquishing control of the wireless channel. By sending frames in succession, frame bursting can improve throughput in the wireless channel. However, if the network devices using frame bursting do not relinquish control of the wireless channel, then other network devices cannot communicate using the wireless connection. Thus, in certain situations, such as OBSS situations, frame bursting can cause performance degradation. As use of wireless networking technologies increases, and density in wireless networks also increases, situations where frame bursting causes performance degradation become more common. Thus, current wireless networking technologies fail to handle frame bursting in OBSS wireless networks.

Accordingly, disclosed are methods and systems for providing frame burst overlapping basic service set (OBSS) handling. In various embodiments, the disclosed methods and systems provide for synchronizing access points (APs) in the same OBSS channel. Based on the synchronizing, the APs in the same OBSS channel can determine a distribution policy for using frame bursting. Each AP can use frame bursting in accordance with the distribution policy. For example, three APs can operate on the same channel. The three APs can periodically send frame burst synchronization packets. The frame burst synchronization packets can indicate respective numbers of client devices associated with each AP. For example, a first AP of the three APs can have three client devices associated with the first AP. A second AP of the three APs can have five client devices associated with the second AP. A third AP of the three APs can have two client devices associated with the third AP. The first AP can send a frame burst synchronization packet indicating that it has three client devices associated with it. The second AP can send a frame burst synchronization packet indicating that it has five client devices associated with it. The third AP can send a frame burst synchronization packet indicating that it has two client devices associated with it. Based on the frame burst synchronization packets sent by the APs, a total number of client devices using the same OBSS channel can be determined. In this example, a distribution policy for using frame bursting can be determined based on the total number of client devices using the same OBSS channel. For example, the distribution policy can involve frame burst transmit opportunity (e.g., TxOp) durations for each AP. Each AP can use frame bursting in accordance with the frame burst transmit opportunity durations based on the distribution policy. For example, the three APs can be allowed equal frame burst transmit opportunity durations during which to use frame bursts to communicate with their respective client devices. By distributing the frame burst transmit opportunity durations among the APs, frame burst can be utilized to increase throughput through a wireless channel without degrading network performance caused by failure to relinquish control of the wireless channel, as further described herein.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless access points (APs) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1A may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140a-d.

In various embodiments, the remote site 132 may be in direct communication with primary site 102, such that client devices 140a-d at the remote site 132 access the network resources at the primary site 102 as if these client devices 140a-d were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150a-b access the network 120. Such a remote site 142 may represent, for example, an individual employee's home or a temporary remote office. The remote site 142 may also be in communication with the primary site 102, such that the client devices 150a-b at remote site 142 access network resources at the primary site 102 as if these client devices 150a-b were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160*a-b*. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160*a-b*. Content servers 160*a-b* may include various providers of multimedia downloadable and/or streaming content, including audio, video, graphical, and/or text content, or any combination thereof. Examples of content servers 160*a-b* include, for example, web servers, streaming radio and video providers, and cable and satellite television providers. The client devices 110*a*–*j*, 140*a-d*, 150*a-b* may request and access the multimedia content provided by the content servers 160*a-b*.

Although only 10 client devices 110*a-j* are illustrated at primary site 102 in the example of FIG. 1, in various applications, a network may include dramatically larger quantities of client devices. For example, various wireless networks may include hundreds, thousands, or even tens of thousands of client devices communicating with their respective APs, potentially at the same time. Furthermore, as there is a finite number of available wireless channels with which to communicate, these client devices communicating with their respective APs may attempt to use the same wireless channels at the same time. As noted above, communicating with the same wireless channels can lead to medium contention as client devices and APs may contend for use of the wireless channels. These situations can be especially common in dense network configurations, such as in a wireless network that includes hundreds, thousands, or even tens of thousands of client devices communicating with their respective APs. The use of various wireless communication techniques, such as the frame burst techniques described herein, may have an effect on these situations as excessive use of frame burst without relinquishing control of a wireless channel may prevent other devices from using the wireless channel. As further described herein, these situations may be addressed by synchronizing APs operating on the same wireless channel, allowing the APs to distribute their access to the wireless channel. Furthermore, the use of frame burst techniques as described herein can increase throughput of the wireless channel, improving overall performance.

Figure 2A:
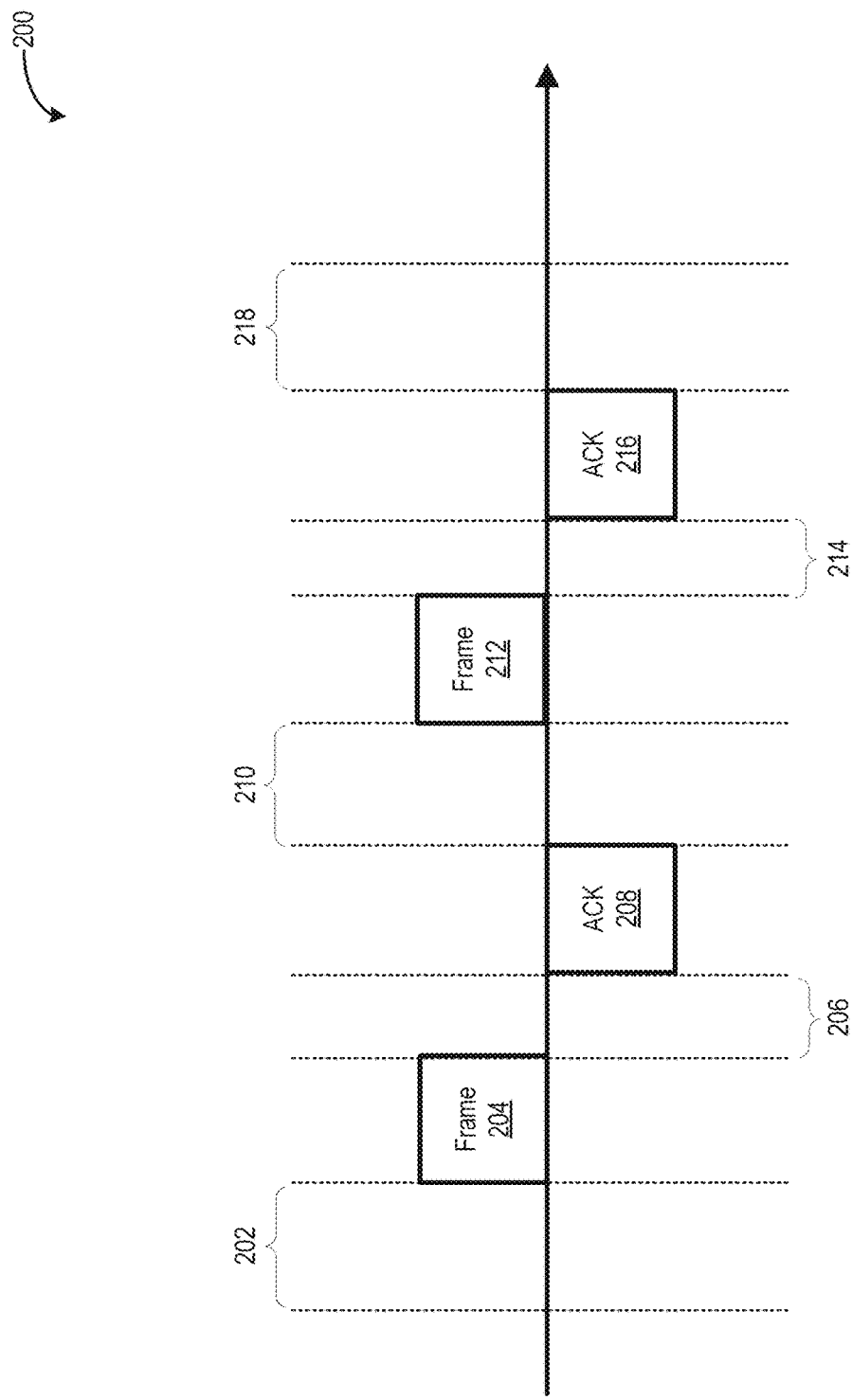
FIGS. 2A-2B illustrate example transmissions associated with frame burst.

FIG. 2A illustrates an example transmission 200 on a wireless channel. The example transmission 200 can occur, for example, between devices in a wireless network, such as the APs 106*a-c* and the client devices 110*a-j* of FIG. 1. As illustrated in FIG. 2A, the example transmission 200 includes an idle duration 202. The idle duration 202 can, for example, be referred to as a distributed interframe space (DIFS) duration. If no device on a network is transmitting during the idle duration 202, then the wireless channel is free, and a data frame can be transmitted. If, for example, a frame was heard on the wireless channel during the idle duration 202, then the wireless channel is busy, and transmission of a data frame may cause a collision. In the example transmission 200, following the idle duration 202 when no frame was transmitted, a frame 204 is transmitted. The frame 204 can be transmitted, for example, from one device in a wireless network to another device in the wireless network. After the frame 204 is transmitted, the example transmission 200 includes a waiting duration 206. The waiting duration 206 can, for example, be referred to as a short interframe space (SIFS) duration. The waiting duration 206 allows time for the frame 204 to be received and processed and for a response to the frame 204 to be transmitted. In the example transmission 200, following the waiting duration 206, an acknowledgment 208 is transmitted. The acknowledgment 208 can be transmitted, for example, as a response to the frame 204 to acknowledge that the frame 204 was received. After the acknowledgment 208 is received, the example transmission 200 includes an idle duration 210 during which other devices in the wireless network may transmit using the wireless channel. In the example transmission 200, following the idle duration 210, a frame 212 is transmitted. The frame 212 can be transmitted, for example, based on a determination that the wireless channel is not busy. Following the transmission of the frame 212, the example transmission 200 includes a waiting duration 214 to allow time for the frame 212 to be received and processed and to allow time for a response to the frame 212 to be transmitted. Following the waiting duration 214, the example transmission 200 includes an acknowledgement 216 is transmitted to acknowledge that the frame 212 was received. After the acknowledgement 216 is transmitted, the example transmission 200 includes an idle duration 218 to allow other devices in the wireless network to transmit using the wireless channel. As illustrated in FIG. 2A, wireless transmissions can include several durations in which no data is being transmitted to allow opportunities for devices to share a wireless channel.

Figure 2B:
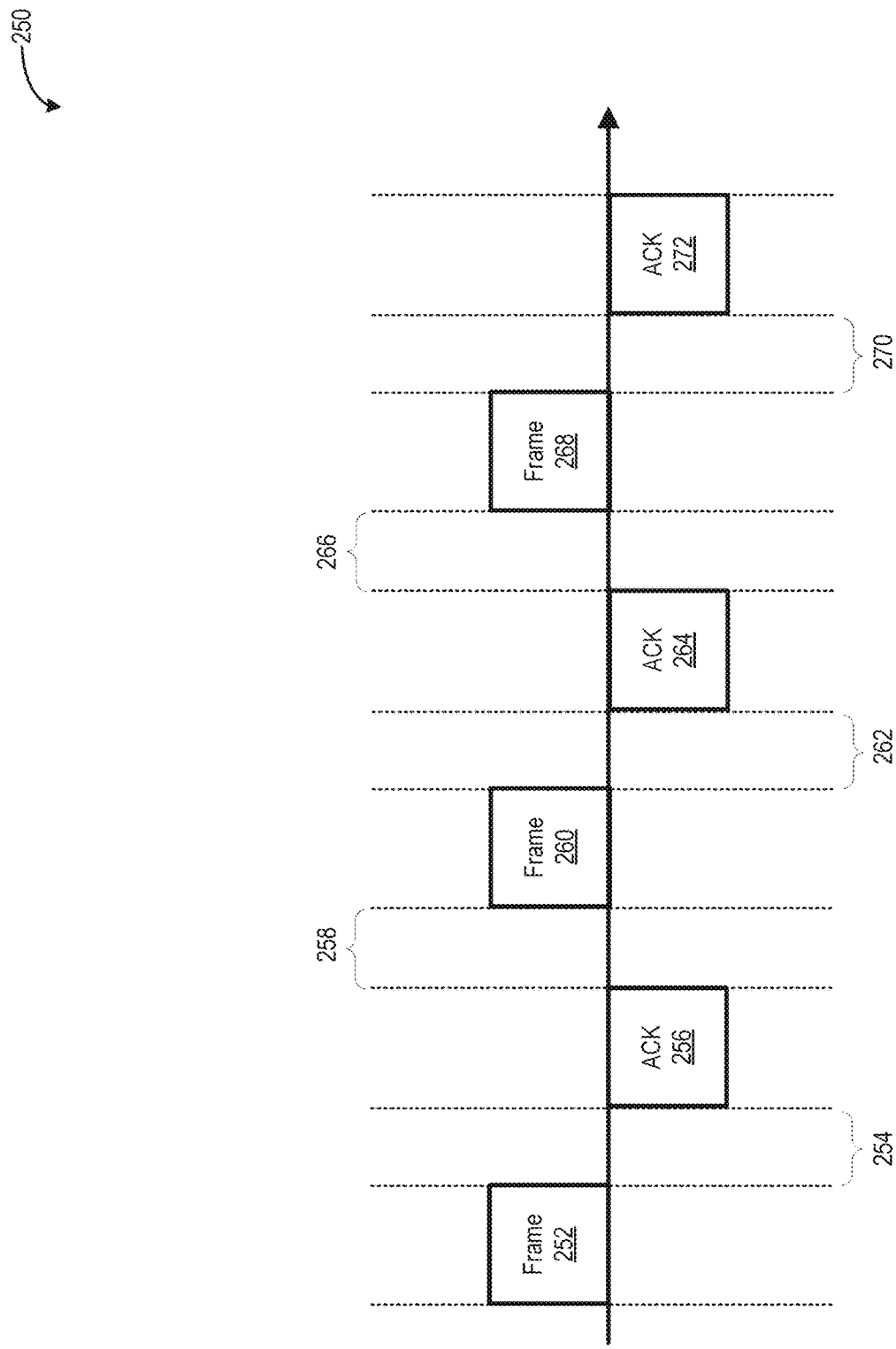

FIG. 2B illustrates an example transmission 250 involving frame burst on a wireless channel. The example transmission 250 can occur, for example, between devices in a wireless network, such as the APs 106*a-c* and the client devices 110*a-j* of FIG. 1. As illustrated in the example transmission 250 of FIG. 2B, a frame 252 is transmitted. The frame 252 can be transmitted, for example, from one device in a wireless network to another device in the wireless network. After the frame 252 is transmitted, the example transmission 250 includes a waiting duration 254. The waiting duration 254 can, for example, be referred to as a SIFS duration. The waiting duration 254 allows time for the frame 252 to be received and processed and for a response to the frame 252 to be transmitted. In the example transmission 250, following the waiting duration 254, an acknowledgment 256 is transmitted. The acknowledgment 256 can be transmitted, for example, as a response to the frame 252 to acknowledge that the frame 252 was received. After the acknowledgment 252 is received, the example transmission 250 includes a waiting duration 258, which can be another SIFS duration. The waiting duration 258 allows time for the acknowledgment 256 to be received and processed and for a new frame to be transmitted. In the example transmission 250, following the waiting duration 258, a frame 260 is transmitted. The frame 260 can be, for example, a next frame following frame 252 and sent in response to the acknowledgement 256 that acknowledged receipt of frame 252. After the frame 260 is transmitted, the example transmission 250 includes a waiting duration 262 to allow time for the frame 260 to be received and processed and for a response to the frame 260 to be transmitted. In the example transmission 250, following the waiting duration 262, an acknowledgment 264 is transmitted to acknowledge receipt of the frame 260. In response to the acknowledgment 264, a frame 268 is transmitted following a waiting duration 266, or another SIFS duration. An acknowledgment 272 acknowledging receipt of the frame 268 is transmitted after a waiting duration 270 allowing time for the frame 268 to be received and processed. As illustrated in FIG. 2B, use of frame burst provides increased throughput on a wireless channel. However, aggressive use of frame burst may prevent other devices from transmitting using the wireless channel. To the other devices on the wireless, which may be waiting for a DIFS duration to transmit, the wireless channel appears to be busy as the durations between transmissions and acknowledgments are SIFS durations. Thus, as further described herein, providing APs with a distribution of opportunities to use frame burst allows use of frame burst to improve throughput without performance degradation resulting from a failure to relinquish control of a wireless channel.

Figure 3:
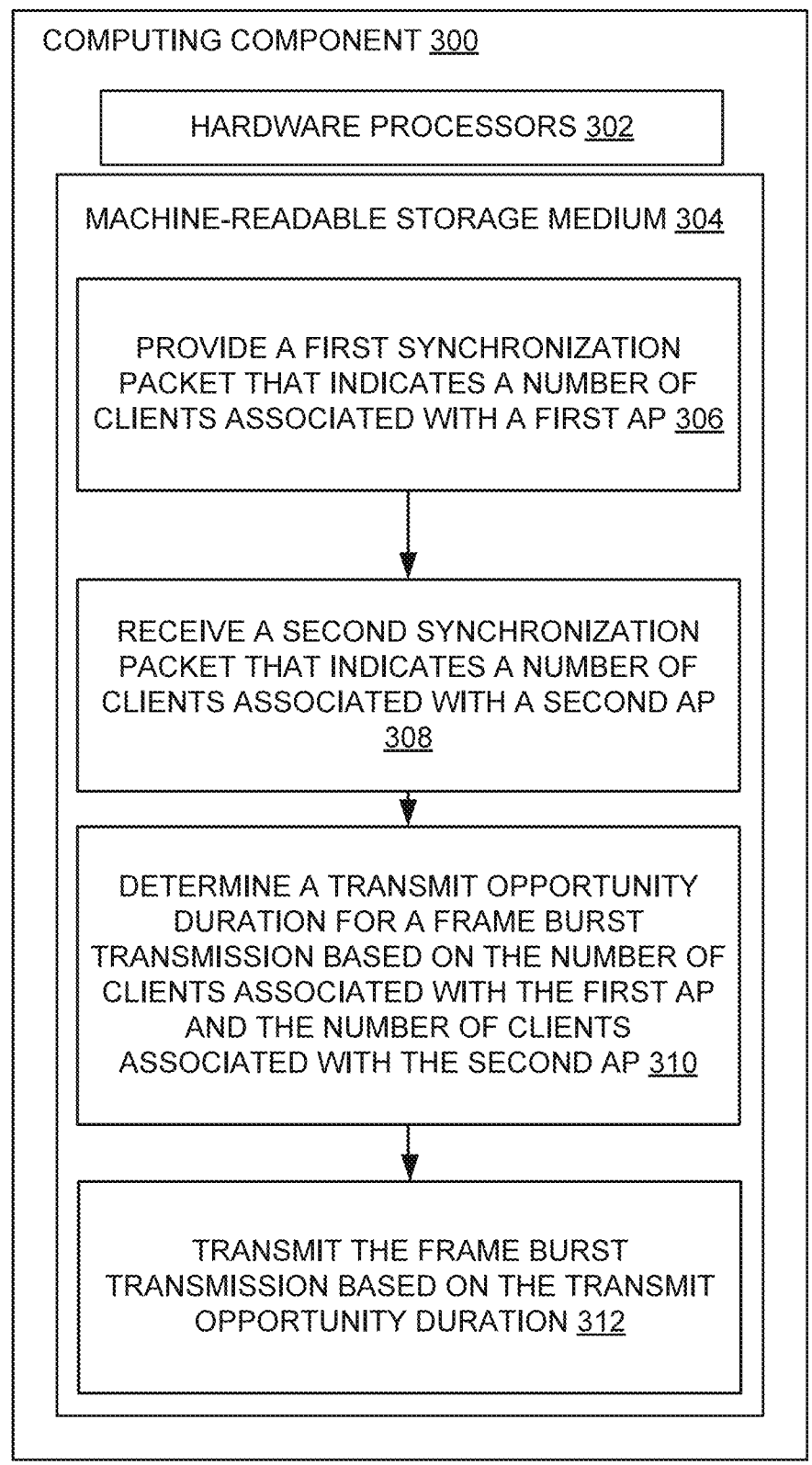
FIG. 3 illustrates an example computing component associated with frame burst overlapping basic service set (OBSS) handling.

FIG. 3 illustrates an example computing component 300 that may be used to implement frame burst overlapping basic service set (OBSS) handling in accordance with various embodiments. The example computing component 300 may be, for example, an access point, a server computer, a controller, or any other similar computing component capable of processing data. In the example implementation of FIG. 3, the computing component 300 includes a hardware processor 302, and machine-readable storage medium 304.

Hardware processor 302 may be one or more central processing units (CPUs), semiconductor-based microprocessors, and/or other hardware devices suitable for retrieval and execution of instructions stored in machine-readable storage medium 304. Hardware processor 302 may fetch, decode, and execute instructions, such as instructions 306-312, to control processes or operations for frame burst OBSS handling. As an alternative or in addition to retrieving and executing instructions, hardware processor 302 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 304, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 304 may be a non-transitory storage medium, where the term "non-transitory" does not encompass transitory propagating signals. As described in detail below, machine-readable storage medium 413 may be encoded with executable instructions, for example, instructions 306-312.

Hardware processor 302 may execute instruction 306 to provide a first synchronization packet that indicates a number of clients associated with a first access point (AP). In various embodiments, an AP can identify clients associated with the AP, such as the clients connected with the AP or communicating with the AP through a wireless connection. In some cases, the clients associated with the AP may be active or inactive. The clients can be identified as active clients based on an amount of traffic received from the AP satisfying a threshold amount of traffic (e.g., 20 packets/second). Inactive clients can be identified based on an amount of traffic received from the AP failing to satisfy the threshold amount of traffic. The clients associated with the AP may be using frame burst or may not support frame burst. The clients associated with the AP may be using frame burst for traffic with respect to an access category (e.g., best effort). The AP can identify active clients using frame burst with respect to an access category and determine a number of active clients that are using frame burst for each access category supported by the AP. Based on the number of active clients, the AP can broadcast a frame bursting synchronization packet. The frame bursting synchronization packet can be broadcasted on a home channel of the AP to be received by other APs on the home channel. The frame bursting synchronization packet broadcasted by the AP communicates a number of active clients that are using frame burst for each access category associated with the AP to the other APs on the home channel. In various embodiments, an AP can broadcast a frame bursting synchronization packet periodically. For example, the AP can broadcast the frame bursting synchronization packet at regular intervals of time (e.g., 100 ms, 1 s) or at regular beacon intervals (e.g., eighth beacon, tenth beacon). By periodically broadcasting frame bursting synchronization packets, the AP can keep other APs updated as to the number of active clients associated with the AP that are using frame burst for an access category.

For example, a network configuration, such as the network configuration illustrated in FIG. 1, can include multiple APs and client devices. A first AP of the multiple APs can identify client devices in communication with the first AP that are using frame burst for an access category, such as best effort. For example, the first AP can have five active clients using frame burst for traffic. The first AP can generate a frame bursting synchronization packet that indicates the first AP is associated with five active clients using frame burst for traffic. The first AP can periodically broadcast the frame bursting synchronization packet on the channel the first AP is using to communicate with its client devices. Other APs in the network configuration that are using the same channel as the first AP can receive the frame bursting synchronization packet from the first AP. The frame bursting synchronization packet from the first AP allows the other APs in the network configuration using the same channel as the first AP to determine the number of active clients associated with the first AP that are using frame burst for traffic. In this example, additional clients can connect to the first AP, and the first AP can update the frame bursting synchronization packet that it is periodically broadcasting based on the additional clients. Many variations are possible.

Hardware processor 302 may execute instruction 308 to receive a second synchronization packet that indicates a number of clients associated with a second AP. As described above, a frame bursting synchronization packet broadcast by an AP allows other APs on the same channel as the AP to determine a number of active clients associated with the AP that are using frame burst. In various embodiments, an AP can determine a total number of active clients that are using frame burst based on the frame bursting synchronization packets broadcast by other APs. The total number of active clients can be based on a sum of a number of active clients associated with the AP and the numbers of active clients indicated in the frame bursting synchronization packets broadcast by the other APs. The total number of active clients can be determined with respect to a channel on which the AP is operating and with respect to access categories in which the active clients are using frame burst. As described above, frame bursting synchronization packets can be periodically broadcast. Accordingly, the total number of active clients using frame burst for an access category can be periodically updated based on the periodically broadcast frame bursting synchronization packets.

For example, a network configuration, such as the network configuration illustrated in FIG. 1, can include multiple APs and client devices. A first AP of the multiple APs can identify client devices in communication with the first AP that are using frame burst for traffic from an access category, such as best effort. In this example, the first AP may have three active clients that are using frame burst for traffic. The first AP can receive frame bursting synchronization packets broadcast from other APs on the same channel as the first AP. For example, the first AP can receive a frame bursting synchronization packet from a second AP indicating that the second AP has four active clients using frame burst for traffic. Based on the received frame bursting synchronization packets received from other APs, the first AP can determine a total number of active clients using frame burst for traffic. In this example, the first AP can determine that there is a total of seven active clients using frame burst for traffic, three associated with the first AP and four associated with the second AP. As the number of active clients associated with the first AP or the second AP changes, the total number of active clients using frame burst for an access category can be updated based on updated frame burst synchronization packets. Many variations are possible.

Hardware processor 302 may execute instruction 310 to determine a transmit opportunity duration for a frame burst transmission based on the number of clients associated with the first AP and the number of clients associated with the second AP. In various embodiments, a distribution policy can be determined based on a total number of active clients on a channel using frame burst for an access category. The distribution policy can provide frame burst transmit opportunity durations for APs associated with the distribution policy. A frame burst transmit opportunity duration can provide a duration of time in which an AP can use frame burst. In various embodiments, the distribution policy can include a frame burst transmit opportunity duration based on a total number of active clients on a channel using frame burst for an access category. The frame burst transmit opportunity duration can be a limit for an amount of time or a number of data frames to transmit between an AP and a client device using frame burst. For example, the frame burst transmit opportunity duration can decrease as a number of active clients on a channel using frame burst for an access category increases. The decreased frame burst transmit opportunity duration can facilitate a better distribution of frame burst transmit opportunities among the increased number of active clients. Likewise, the frame burst transmit opportunity duration can increase as a number of active clients on a channel using frame burst for an access category decreases. The increased frame burst transmit opportunity duration can facilitate higher throughput using frame burst while maintaining a distribution of frame burst transmit opportunities among the decreased number of active clients.

As an example of the above, a network configuration, such as the network configuration illustrated in FIG. 1, can include multiple APs and client devices. A first AP of the multiple APs can determine a total number of active clients on a channel associated with the first AP that are using frame burst for an access category, such as best effort. The first AP can determine a distribution policy that includes a frame burst transmit opportunity duration associated with a limit on an amount of time for a frame burst transmission between the first AP and one of its active clients. For example, the first AP can determine, based on frame bursting synchronization packets received from other APs, that a total number of active clients on the same channel as the first AP is ten. The first AP can determine the distribution policy that includes the frame burst transmit opportunity duration based on the ten active clients and the best effort access category. When the first AP communicates with one of its active clients using frame burst, the first AP can limit the frame burst to the frame burst transmit opportunity duration. Many variations are possible.

Hardware processor 302 may execute instruction 312 to transmit the frame burst transmission based on the duration. In various embodiments, an AP can transmit using frame burst in accordance with a frame burst transmit opportunity duration that the AP determined based on a number of total active clients on the same channel as the AP that are using frame burst for an access category. As described above, the frame burst transmit opportunity duration can provide a limit on a duration of a frame burst transmission. For a frame burst transmission, an AP can send multiple physical layer protocol data units (PPDUs) for up to the duration limit in accordance with the frame burst transmit opportunity duration. For example, an AP can perform a frame burst transmission as illustrated in FIG. 2B.

Figure 4A:
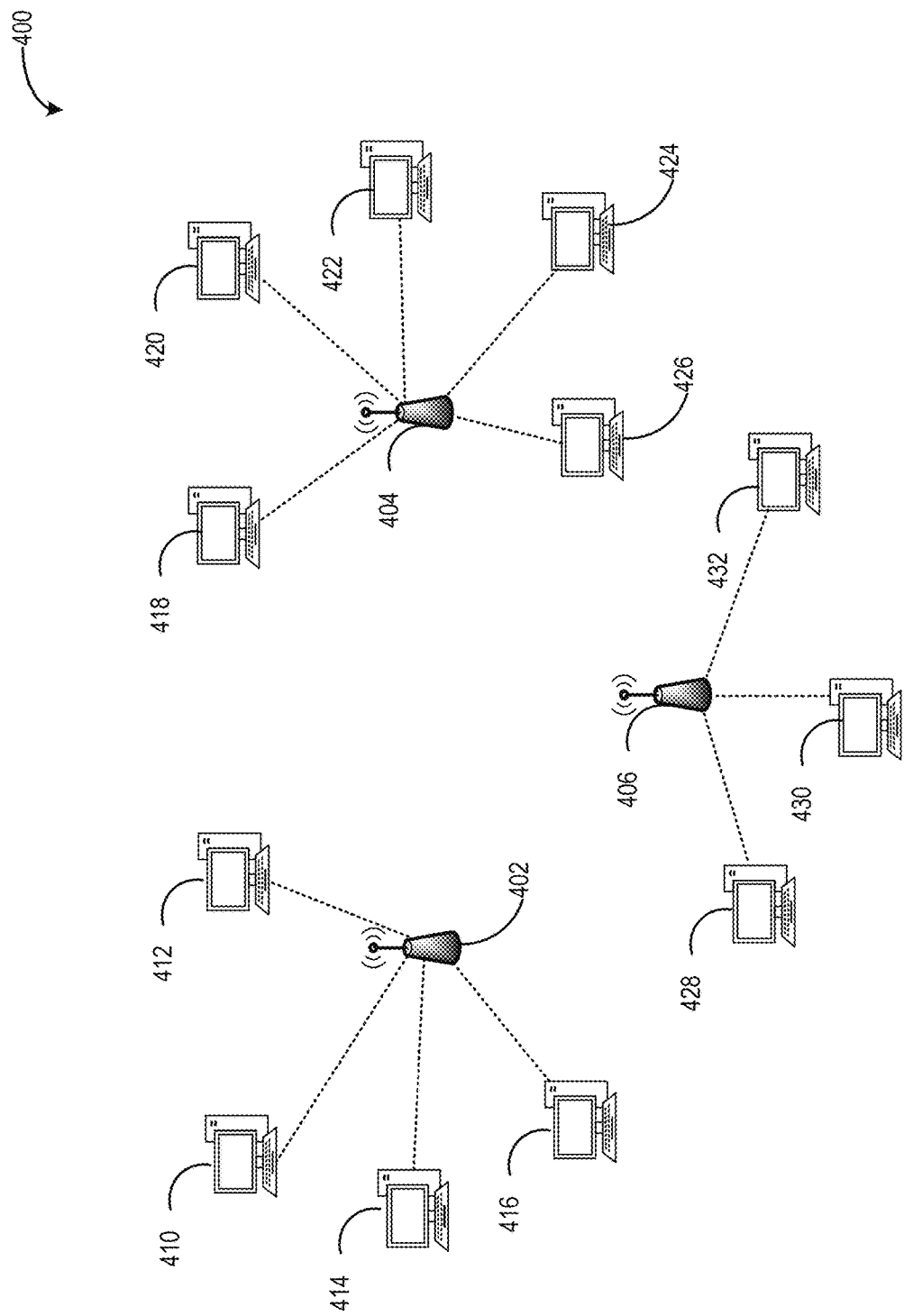
FIG. 4A illustrates an example network configuration associated with frame burst OBSS handling.

FIG. 4A illustrates an example network configuration 400 associated with frame burst overlapping basic service set (OBSS) handling. As illustrated in FIG. 4A, the network configuration 400 includes three access points (APs) 402, 404, 406. The three APs 402, 404, 406 are associated with their respective client devices. AP 402 is associated with client devices 410, 412, 414, 416. AP 404 is associated with client devices 418, 420, 422, 424. AP 406 is associated with client devices 428, 430, 432. In this example, the APs 402, 404, 406 may use frame burst to communicate with their respective client devices using the same channel and access category. For example, AP 402 can use frame burst to communicate with client devices 410, 412, 414, 416. AP 404 can use frame burst to communicate with client devices 418, 420, 422, 424. AP 406 can use frame burst to communicate with client devices 428, 430, 432. As the APs 402, 404, 406 are communicating using the same channel and using frame burst to communicate with their respective clients, the APs may contend for control of the channel. Thus, the example network configuration 400 illustrates a scenario where frame burst OBSS handling is needed.

Figure 4B:
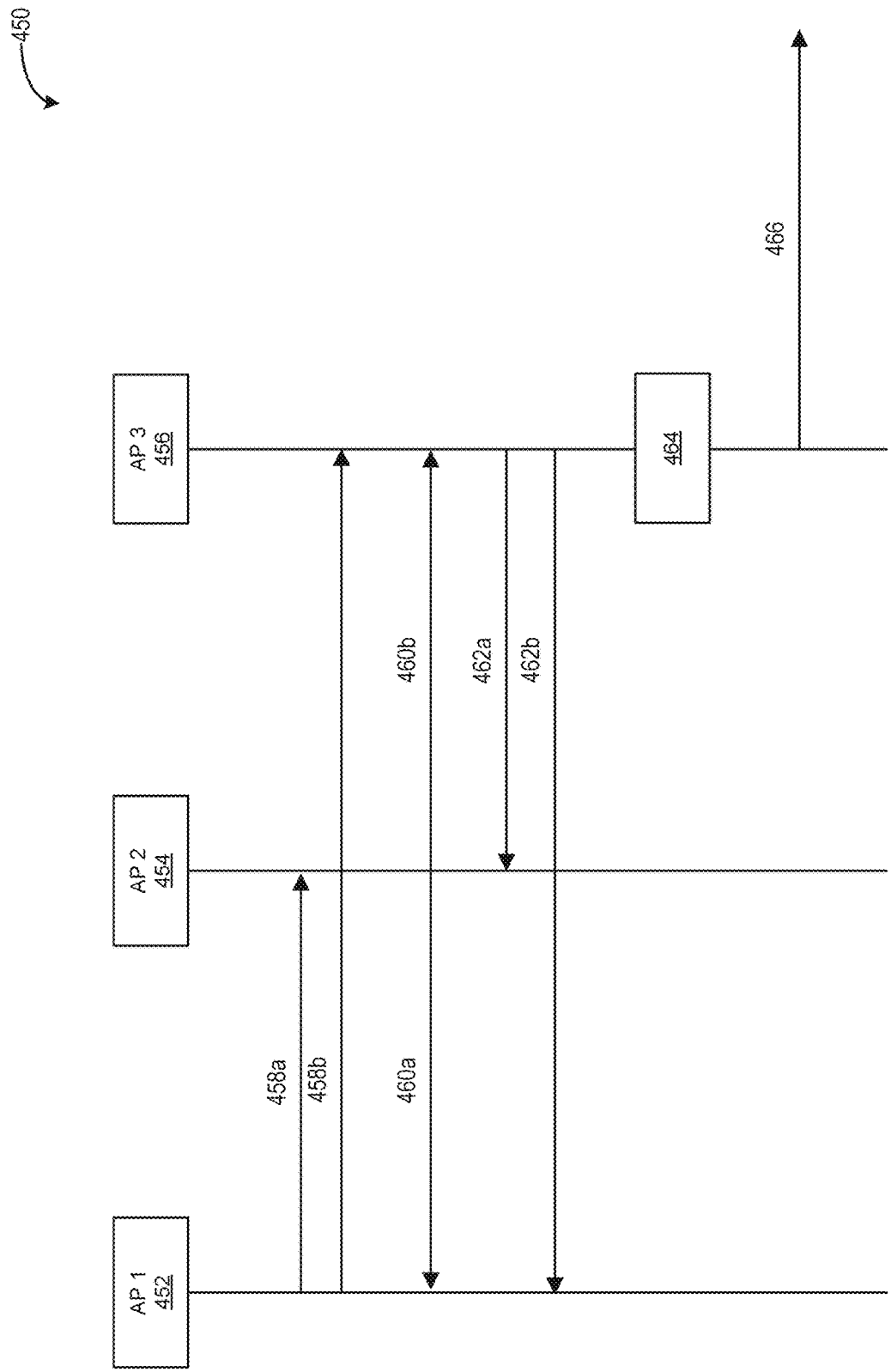
FIG. 4B illustrates an example flow associated with frame burst OBSS handling.

FIG. 4B illustrates an example flow 450 associated with frame burst OBSS handling. The example flow 450 can be performed, for example, by the APs 402, 404, 406 of FIG. 4A, or, for example, the example computing component 300 of FIG. 3. It should be understood that there can be additional, fewer, or alternative steps performed in similar or alternative orders, or in parallel, based on the various features and embodiments discussed herein unless otherwise stated.

As illustrated in FIG. 4B, the example flow 450 involves a first AP 452, a second AP 454, and a third AP 456. For example, the first AP 452, the second AP 454, and the third AP 456 can correspond with the APs 402, 404, 406 of FIG. 4A respectively. At step 458a, 458b, the first AP 452 can broadcast a frame bursting synchronization packet that is received by the second AP 454 and the third AP 456. The frame bursting synchronization packet broadcast by the first AP 452 can, for example, indicate that four active clients using frame burst are associated with the first AP 452. The frame bursting synchronization packet broadcast by the first AP 452 can also indicate, for example, an access category associated with the four active clients. At step 460*a*, 460*b*, the second AP 454 can broadcast a frame bursting synchronization packet that is received by the first AP 452 and the third AP 456. The frame bursting synchronization packet broadcast by the second AP 454 can, for example, indicate that five active clients using frame burst are associated with the second AP 454. The frame bursting synchronization packet broadcast by the second AP 454 can also indicate, for example, an access category associated with the five active clients. At step 462*a*, 462*b*, the third AP 456 can broadcast a frame bursting synchronization packet that is received by the first AP 452 and the second AP 454. The frame bursting synchronization packet broadcast by the third AP 456 can, for example, indicate that three active clients using frame burst are associated with the third AP 456. The frame bursting synchronization packet broadcast by the third AP 452 can also indicate, for example, an access category associated with the three active clients. At step 464, the third AP 456 can determine a distribution policy based on a total number of active clients and the access category associated with the active clients. For example, the third AP 456 can determine that the total number of active clients associated with the access category is twelve based on the frame bursting synchronization packet from the first AP 452 and the frame bursting synchronization packet from the second AP 454. At step 466, the third AP can perform a frame burst transmission based on the distribution policy determined at step 464. As illustrated in this example, by determining a distribution policy based on a total number of active clients and performing a frame burst transmission based on the distribution policy, an AP, such as the third AP 456, can account for other active clients using frame burst in the network and avoid performance degradation of the network associated with failure to relinquish control of a channel due to frame bursting.

Figure 5:
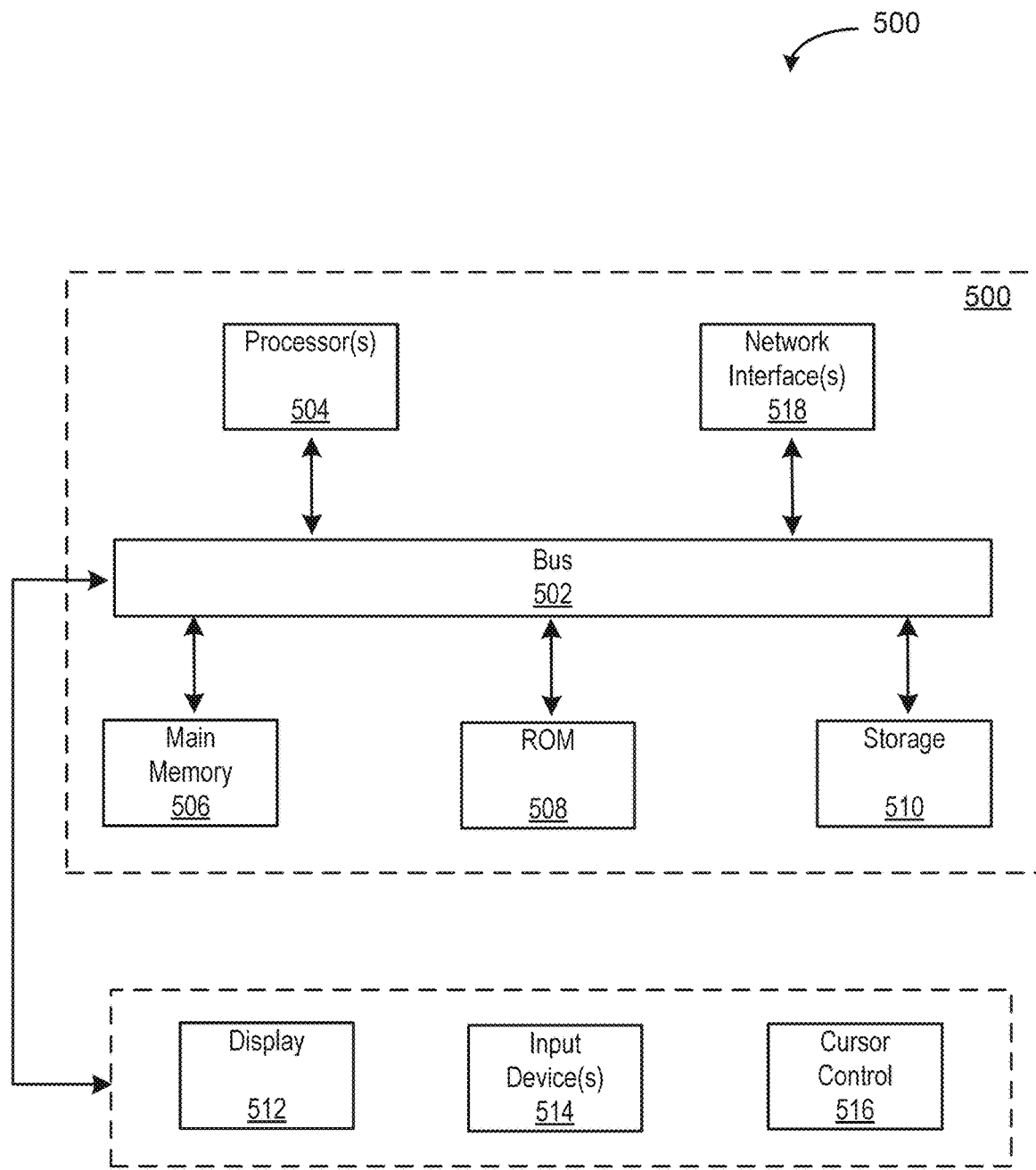
FIG. 5 is an example computing component that may be used to implement various features of embodiments described in the present disclosure.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic, or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic, or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network, and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
   transmitting, by a first access point (AP), a frame burst synchronization packet to a set of clients in a network, wherein the frame burst synchronization packet comprises an access category;
   upon receiving a number of responses to the frame burst synchronization packet corresponding with the access category, determining, by the first AP, the number corresponds with a number of the set of clients in the network that utilize the access category supported by the first AP;

providing, by the first AP, a first synchronization packet that indicates the number of clients associated with the first AP that support the access category supported by the first AP;

receiving, by the first AP, a second synchronization packet that indicates a number of clients associated with a second AP, wherein the second AP supports the access category;

determining, by the first AP, a transmit opportunity duration for a frame burst transmission based on the number of clients associated with the first AP and the number of clients associated with the second AP; and transmitting, by the first AP, the frame burst transmission based on the transmit opportunity duration followed by an idle time interval allowing the clients associated with the first AP or the clients associated with the second AP to transmit using a wireless channel associated with the frame burst transmission.

2. The method of claim 1, wherein the first synchronization packet further indicates traffic from a best effort access category of the clients associated with the first AP and the second synchronization packet further indicates traffic from the best effort access category of the clients associated with the second AP.

3. The method of claim 1, wherein the transmit opportunity duration for the frame burst transmission is further based on traffic from a best effort access category of the clients associated with the first AP and traffic from the best effort access category of the clients associated with the second AP.

4. The method of claim 1, wherein the transmit opportunity duration for the frame burst transmission is a limit on an amount of time for the frame burst transmission and the transmitting the frame burst transmission comprises transmitting physical layer protocol data units (PPDUs) up to the limit.

5. The method of claim 1, further comprising:
determining, by the first AP, a change in the number of clients associated with the first AP; and
providing, by the first AP, an updated synchronization packet that indicates the change in the number of clients associated with the first AP.

6. The method of claim 5, wherein the transmit opportunity duration for the frame burst transmission is updated based on the change in the number of clients associated with the first AP.

7. The method of claim 1, wherein the access category is a first access category, and the method further comprises:
determining a second access category supported by the first access point and the second access point;
transmitting, by the first access point and the second access point, a second frame burst synchronization packet to the set of clients in the network, wherein the second frame burst synchronization packet comprises the second access category; and
upon receiving a second number of responses to the second frame burst synchronization packet corresponding with the second access category, determining, by the first AP, the second number corresponds with a second number of clients that support the second access category supported by the first AP.

8. The method of claim 7, wherein the number of clients associated with the first AP is different than the number of clients associated with the second AP, and wherein the transmit opportunity duration for the frame burst transmission differs based on the number of clients associated with the first AP being different than the number of clients associated with the second AP.

9. A system, comprising:
a processor; and
a memory operatively connected to the processor, and including computer code that when executed, causes the system to:
transmit, by a first access point (AP), a frame burst synchronization packet to a set of clients in a network, wherein the frame burst synchronization packet comprises an access category;
upon receiving a number of responses to the frame burst synchronization packet corresponding with the access category, determine the number corresponds with a number of the set of clients in the network that utilize the access category supported by the first AP;
provide a first synchronization packet that indicates the number of clients associated with the first AP that support the access category supported by the first AP;
receive a second synchronization packet that indicates a number of clients associated with a second AP;
determine a transmit opportunity duration for a first frame burst transmission based on the number of clients associated with the first AP and the number of clients associated with the second AP;
transmit the first frame burst transmission based on the transmit opportunity duration; and
wait for an idle duration allowing the clients associated with the first AP or the clients associated with the second AP to transmit using a wireless channel associated with the frame burst transmission.

10. The system of claim 9, wherein the first synchronization packet further indicates traffic from a best effort access category of the clients associated with the first AP and the second synchronization packet further indicates traffic from the best effort access category of the clients associated with the second AP.

11. The system of claim 9, wherein the transmit opportunity duration for the frame burst transmission is further based on traffic from a best effort access category of the clients associated with the first AP and traffic from the best effort access category of the clients associated with the second AP.

12. The system of claim 9, wherein the transmit opportunity duration for the frame burst transmission is a limit on an amount of time for the frame burst transmission and the transmitting the frame burst transmission comprises transmitting physical layer protocol data units (PPDUs) up to the limit.

13. The system of claim 9, wherein the computer code further causes the system to:
determine a change in the number of clients associated with the first AP; and
provide an updated synchronization packet that indicates the change in the number of clients associated with the first AP.

14. The system of claim 13, wherein the transmit opportunity duration for the frame burst transmission is updated based on the change in the number of clients associated with the first AP.

15. A non-transitory computer-readable storage medium including instructions that, when executed by at least one processor of a computing system, cause the computing system to:

transmit a frame burst synchronization packet to a set of clients in a network, wherein the frame burst synchronization packet comprises an access category supported by a first access point (AP);

upon receiving a number of responses to the frame burst synchronization packet corresponding with the access category, determine the number corresponds with a number of the set of clients in the network that utilize the access category supported by the first AP;

provide a first synchronization packet that indicates a number of clients associated with the first AP;

receive a second synchronization packet that indicates a number of clients associated with a second AP;

determine a transmit opportunity duration for a frame burst transmission based on the number of clients associated with the first AP and the number of clients associated with the second AP;

determine that a wireless channel is free to transmit; and transmit the frame burst transmission on the wireless channel based on the transmit opportunity duration followed by an idle time interval allowing the clients associated with the first AP or the clients associated with the second AP to transmit using a wireless channel associated with the frame burst transmission.

16. The non-transitory computer-readable storage medium of claim 15, wherein the first synchronization packet further indicates traffic from a best effort access category of the clients associated with the first AP and the second synchronization packet further indicates traffic from the best effort access category of the clients associated with the second AP.

17. The non-transitory computer-readable storage medium of claim 15, wherein the transmit opportunity duration for the frame burst transmission is further based on traffic from a best effort access category of the clients associated with the first AP and traffic from the best effort access category of the clients associated with the second AP.

18. The non-transitory computer-readable storage medium of claim 15, wherein the transmit opportunity duration for the frame burst transmission is a limit on an amount of time for the frame burst transmission and the transmitting the frame burst transmission comprises transmitting physical layer protocol data units (PPDUs) up to the limit.

19. The non-transitory computer-readable storage medium of claim 15, wherein the instructions further causes the system to:

determine a change in the number of clients associated with the first AP; and provide an updated synchronization packet that indicates the change in the number of clients associated with the first AP.

20. The non-transitory computer-readable storage medium of claim 15, wherein the transmit opportunity duration for the frame burst transmission is updated based on a change in the number of clients associated with the first AP.

* * * * *